United States Patent
Kumar et al.

(10) Patent No.: US 11,175,977 B2
(45) Date of Patent: Nov. 16, 2021

(54) METHOD AND SYSTEM TO DETECT FAILURE IN PCIE ENDPOINT DEVICES

(71) Applicant: NXP USA, Inc., Austin, TX (US)

(72) Inventors: Udit Kumar, Noida (IN); Varun Sethi, Noida (IN); Prabhjot Singh, Noida (IN); Wasim Khan, Noida (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/742,075

(22) Filed: Jan. 14, 2020

(65) Prior Publication Data

US 2021/0216388 A1 Jul. 15, 2021

(51) Int. Cl.
G06F 11/07 (2006.01)
G06F 13/42 (2006.01)
G06F 13/20 (2006.01)

(52) U.S. Cl.
CPC ........ *G06F 11/079* (2013.01); *G06F 11/0706* (2013.01); *G06F 11/0751* (2013.01); *G06F 11/0772* (2013.01); *G06F 13/20* (2013.01); *G06F 13/4282* (2013.01); *G06F 2213/0026* (2013.01)

(58) Field of Classification Search
CPC .............. G06F 11/079; G06F 11/0706; G06F 11/0751; G06F 11/0772
See application file for complete search history.

(56) References Cited

U.S. PATENT DOCUMENTS

| | | | |
|---|---|---|---|
| 6,665,758 B1 | 12/2003 | Frazier et al. | |
| 7,353,443 B2 | 4/2008 | Sharma | |
| 2008/0005706 A1 | 1/2008 | Sharma et al. | |
| 2010/0315134 A1 | 12/2010 | Murari | |
| 2011/0004816 A1 | 1/2011 | Wood et al. | |
| 2017/0329735 A1 | 11/2017 | Garg et al. | |
| 2017/0337069 A1* | 11/2017 | Huang | G06F 11/221 |
| 2017/0344419 A1* | 11/2017 | Watkins | G06F 11/0781 |
| 2019/0361763 A1* | 11/2019 | Bakshi | A61N 1/378 |

(Continued)

OTHER PUBLICATIONS

Rohitha Ravoori et al., Sion Semiconductors, A Deeper Look at PCIe 3.0 Protocol, White Paper, Feb. 11, 2017, http://www.sionsemi.com/whitepapers/pcie-overview.html.

(Continued)

*Primary Examiner* — Nadeem Iqbal

(57) ABSTRACT

A method, system, apparatus, and architecture are provided for detecting failure of a PCIe endpoint device by scanning an extended configuration space for each connected PCIe endpoint device to detect a first PCIe endpoint device that supports advance status reporting, and then by programming a first predetermined value and a second predetermined value, respectively, into an endpoint response register and a root complex request register of a dedicated memory control word in the extended configuration space for the first PCIe endpoint device, where the second predetermined value signals a request to the first PCIe endpoint device to update the endpoint response register of the dedicated memory control word with a new status value so that, after a minimum specified delay, a report that the first PCIe endpoint device has failed may be generated in response to detecting that the first predetermined value is stored in the endpoint response register.

20 Claims, 5 Drawing Sheets

(56) References Cited

U.S. PATENT DOCUMENTS

2020/0310933 A1    10/2020    Zhu et al.

OTHER PUBLICATIONS

Siddharth Garg et al., Challenges in verifying PCI Express in complex SoCs, Nov. 20, 2019 https://www.design-reuse.com/articles/38437/challenges-in-verifying-pci-express-in-complex-socs.html.
Richard Solomon, PCI Express Basics & Background, 2014.
infosecinstitute.com, System Address Map Initialization in x86/x64 Architecture Part 2: PCI Express-Based Systems, Dec. 3, 2019.

* cited by examiner

METHOD AND SYSTEM TO DETECT FAILURE IN PCIE ENDPOINT DEVICES

BACKGROUND OF THE INVENTION

Field of the Invention

The present invention is directed in general to high-speed serial buses and associated methods of operation. In one aspect, the present invention relates to endpoint device failure detection on a high-speed peripheral component interconnect express bus.

Description of the Related Art

PCI-Express (PCIe) is the backbone of today's complex systems requiring high speed data communication with high throughput, and is useful for enhancing a limited functionality system (e.g., computer processing unit or CPU) by specifying a very high-speed data communication link that can be connected to a system having the missing functionality (e.g., a graphics card). Used extensively in different applications, such as computer cards, graphic cards, automotive networks, networking, industrial and consumer applications, PCIe is useful for very high-speed data applications for real-time graphics and video processing, such as required by Advanced Driver Assistance Systems (ADAS). The PCIe specification includes a set of advanced error reporting and error logging features to detect and specify the type of error that occurs in a PCIe link, such as receiver errors, Data Link Layer Packet Cyclical Redundancy Checking (CRC) errors, Transaction Layer Packet (TLP) CRC errors, and malformed TLP errors. To assist with error detection and/or correction by the host CPU, the PCIe Specification provides that each PCIe endpoint device includes a Link Training and Status State Machine (LTSSM) hardware which detects certain lane or communication link failures and enters a Recovery state which sends an interrupt to the host/CPU via the root complex (RC) so that the faulty link is eliminated or reset by the host CPU. However, there are some PCIe endpoint device failures that are not detected by the LTSSM hardware, such as when the PCIe endpoint device is located behind a switch, in which case the LTSSM state will not reach the software running on the host CPU. In addition, when the failure is due to a software state of the device, such as when the CPU crashes or is stuck in a while loop, etc., the LTSSM state will not reach the host CPU. As seen from the foregoing, the existing PCIe error detection solutions are extremely difficult at a practical level by virtue of the challenges with providing flexible and comprehensive error detection and correction hardware within the performance, design, complexity and cost constraints of existing PCIe interconnect systems.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

An advance status reporting method, device, system, and program code are described for discovering an endpoint device failure on a PCI Express interconnect bus by defining a dedicated memory word (4 bytes) in the extended configuration space for each endpoint device which is periodically set by host software to first value for soliciting endpoint device status reporting and then monitored by host software to detect any failure by the endpoint device to provide a status report, thereby indicating a failure in the endpoint device(s). In selected embodiments, advance status reporting is enabled by using a capabilities pointer in the extended PCI configuration space of a PCIe endpoint device or switch, or PCIe bridge to point to the next capabilities pointer in the PCIe capabilities register set which, in turn, points to the dedicated memory word which includes a first byte (Byte 0) which contains an advance reporting capability indication for the EP device, a second byte (Byte 1) which contains the next capabilities pointer, a third byte (Byte 2) which contains a root complex request, and a fourth byte (Byte 3) which contains the endpoint response received from the EP device. In operation, host software is configured during enumeration to check each EP device's first byte (Byte 0) to determine if the device supports advance reporting and to start a thread for advance status reporting from each EP device which supports advance reporting. In addition, the host software may be configured to periodically clear the fourth byte (Byte 3) to a 0 value and to program the third byte (Byte 2) to request advance status reporting in the EP device configuration space, thereby triggering the EP device to collect the required status and update the fourth byte (Byte 3) with the EP response. By periodically checking to see if the fourth byte (Byte 3) contains a 0 value, the host software can report the EP device failure to upper software to initiate device recovery.

Figure 1:
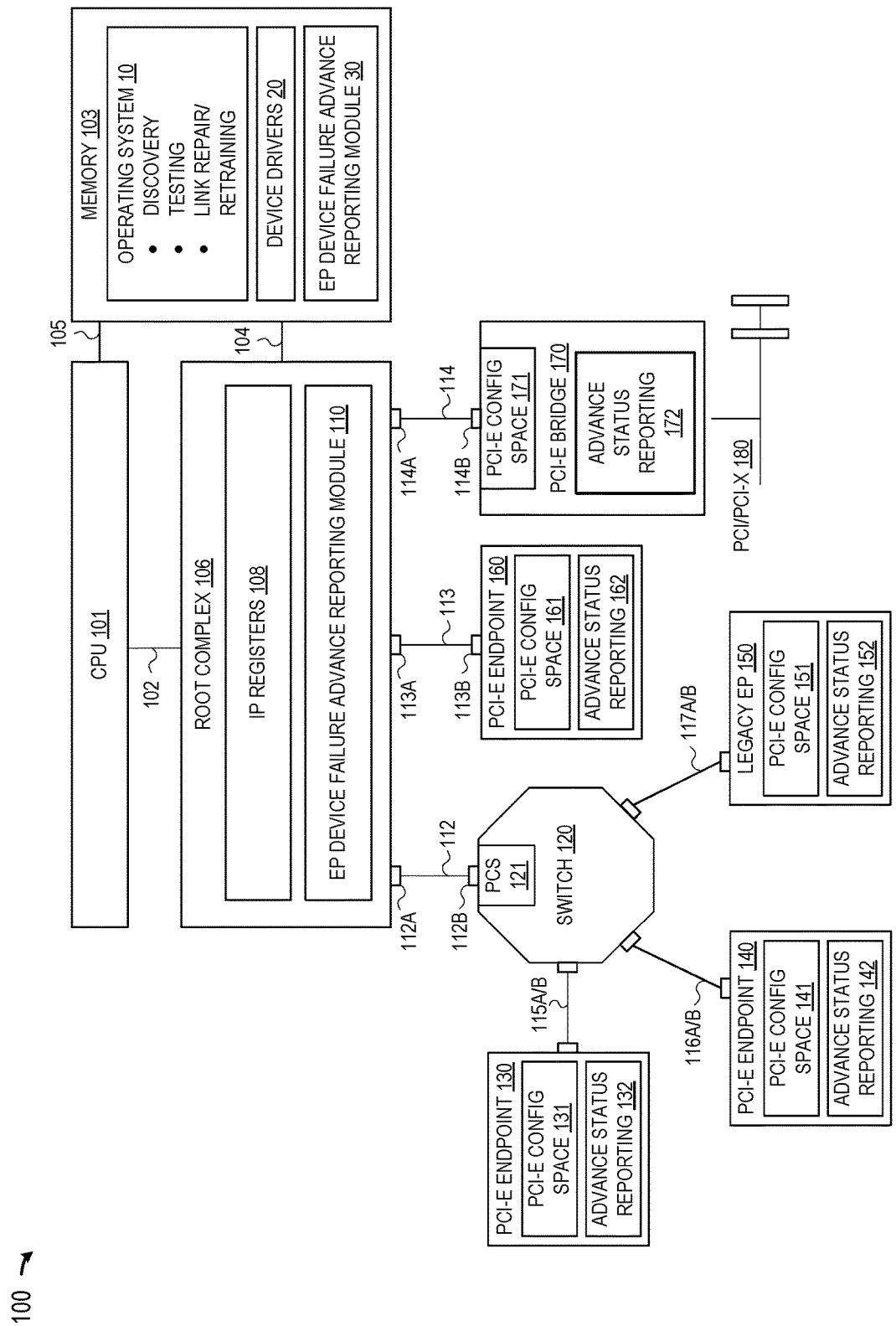
FIG. 1 is a block diagram of a PCIe communication system which provides endpoint device failure advance reporting in accordance with selected embodiments of the present disclosure.

To provide additional details for an improved understanding of selected embodiments of the present disclosure, reference is now made to FIG. 1 which depicts a block diagram of a PCIe communication system 100 which provides a CPU 101 and memory 103 that are communicatively coupled through a root complex 106 to access any of the PCIe devices 120, 130, 140, 150, 160, 170 using the PCIe switch-based serial interconnect. As used herein, PCIe (peripheral component interconnect express) is an interface standard for connecting high-speed peripheral devices or components to a computer (also referred to as a central processing unit (CPU), a computing device, a server, a data processing system, etc.) based on a point-to-point topology. With the depicted arrangement, the root complex 106 can directly access the memory 103 over the bus 104 without CPU intervention, just like DMA. In addition, the CPU 101 uses the root complex 106 to access any of the PCIe devices 120, 130, 140, 150, 160, 170 and to generate interrupts to the CPU 101 for any of the events generated by root complex 106 or the events generated by any other PCIe devices 120, 130, 140, 150, 160, 170.

In the illustrated example, the root complex 106 may include a first root port 112A for connection over the PCIe bus 112 to a switch port 112B of a switch 120, where the first root port 112A, PCIe bus 112, and switch port 112B are collectively identified as the port/bus link 112A/B. In turn, the switch 120 is connected, respectively, over PCIe port/bus links 115A/B, 116A/B, 117A/B to one or more PCIe endpoint devices 130, 140, 150. In addition, the root complex 106 may include a second root port 113A for direct connection over a PCIe bus 113 to an upstream port 113B of the PCIe endpoint device 160. The root complex 106 may also include a third root port 114A that is directly connected over a PCIe bus 114 to an upstream port 114B of the PCIe Bridge 170 to PCI/PCI-X bus 180 that provides a connection between a PCIe link and a PCI/PCI-X link. The PCIe buses 112-117 are logical connections (a.k.a., interconnects or links) which are used to connect the PCIe endpoint devices 120, 130, 140, 150, 160, 170 and to detect the status and bandwidth of each PCIe endpoint device (e.g., PCIe endpoint device 130). As used herein, a link is a point-to-point communication channel between two PCIe ports that allows both ports to send and receive PCIe requests (e.g., configuration, IO or memory read/write) and interrupts (e.g., INTx, MSI or MSI-X). At the physical level, a link is composed of one or more lanes. For example, a low-speed peripheral device (e.g., an 802.11 Wi-Fi card) uses a single-lane (x1) link, while a graphics adapter typically uses a much wider and faster 16-lane link.

In the depicted PCIe communication system 100, the CPU 101 may be any suitable processing device, such as a processor, that may be programmed with an software instructions and/or programming code. Thus, the CPU 101 may be embodied with one or more processors, each having one or more processor cores included therein. The CPU 101 may represent one or more general-purpose processors such as a microprocessor, a microcontroller, or the like. For example, the CPU 101 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The CPU 101 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Connected to the CPU 101 over a memory bus 105 is a memory 103 which may store programming code and/or software instructions for execution by the CPU 101. The memory 103 may include one or more volatile storage (or memory) devices such as random access memory (RAM), dynamic RAM (DRAM), synchronous DRAM (SDRAM), static RAM (SRAM), or other types of storage devices. In addition or in the alternative, the memory 103 may include non-volatile memory, such as read only memory (ROM), electrically erasable programmable ROM, flash memory, or the like. In whatever form, the memory 103 may store information including sequences of instructions that are executed by the CPU 101 or any other device. For example, executable code and/or data, in including but not limited to an operating system 10, device drivers 20, firmware (e.g., input output basic system or BIOS), and/or applications can be loaded in the memory 103 and executed by the processor 101. In addition and as described hereinbelow, the memory 103 may also store an endpoint device failure advance reporting module 30.

As will be appreciated in the context of the present disclosure, the operating system 10 may include system software that manages and controls the resources in the PCIe communication system 100, including but not limited to basic input/output system (BIOS) programming and/or with host software for implementing specified PCIe functionality, such as, for example, processing interrupt requests and/or recovery loops to perform an endpoint device enumeration, restart, link restart, and/or bus rescan. For example, operating system 10 may include one or more utility tools configured to discover, test, retrain and/or repair one or more PCIe devices 120, 130, 140, 150, 160, 170 and their respective root complexes (e.g., 106), and to access their PCIe configuration space headers in order to read the statuses of the discovered PCIe devices and modify the states of the discovered PCIe devices. In selected embodiments, the operation system 10 may include a device discovery module, testing module, and link repair/retrain module, where each module may be implemented in software, hardware, or a combination thereof. In selected embodiments, device discovery module may be used to detect one or more PCIe devices using a PCIe enumeration process wherein the host system reads the configuration space of each PCIe endpoint device. In addition, the operating system 10 may perform basic tasks, such as controlling and allocating virtual memory, prioritizing the processing of instructions, controlling virtualized input and output devices (e.g., PCIe devices), facilitating networking, managing a virtualized file system, etc. Any suitable operating system 10 can be used, including but not limited to Windows® operating system from Microsoft®, Mac OS®/iOS® from Apple®, Android® from Google®, Linux®, Unix®, or other real-time or embedded operating systems.

In keeping with the functionality of the operating system 10, the memory 103 may also store one or more device drivers 20 that are used to interact with the one or more PCIe devices 120, 130, 140, 150, 160, 170. Device drivers 20 may be a computer software that provides interaction with a hardware device (e.g., PCIe device 130) to an OS (e.g., operating system 10) or other application software. For example, due to the specialized role of a device driver, device drivers are often hardware-dependent and operating system-dependent, which may be running with a kernel of the operating system.

The PCIe communication system 100 also includes a root complex 106 that is connected to the CPU 101 and memory 103. Located at the uppermost layer of the tree structure of the PCIe communication system 100, the root complex 106 is respectively connected through a system or front side bus 102 with CPU 101 and through a memory bus 104 with memory 103. The root complex 106 includes IP registers 108 which are used to configure the IP. In particular, the IP registers 108 are used to enable the clocks, to program the files, to configure the lane width (1 lane or 2 lane), and/or to configure the speed mode (gen 1 or gen2 or gen3). In addition, the root complex registers 108 are used by the CPU 101 to define a configurable address space for translating addresses from CPU address space to the PCIe address space. In the PCIe system, there are four spaces: memory space, I/O space, message space and configuration space. Apart from message space, the other spaces will have physical address associated with it. The size of the configuration space is 4 KB while that of an I/O space is 64 KB. Configuration space will have all the information about the device. It has device ID, vendor ID, class code and various capabilities of the device. It is a software backward compatible to a PCI which has a size of 256 Bytes. Of this 4 KB of configuration space, the first 64 bytes are standard and are called as Standardized Headers. These Standardized Headers are of two types (Type 0 & Type 1). Type 0 will be used by the PCIe end points (e.g., 130) and will have information that is applicable to end points. Type 1 will be used by root ports (e.g., 112A), switches (e.g., 120), and bridges (e.g., 170). It contains information applicable only to those. Every PCIe endpoint device 120, 130, 140, 150, 160, 170 will also have a PCIe configuration space (PCS), but with a different type of header from that used in root complex 106.

Connected to the root complex 106 are a plurality of PCIe switches 120, endpoint devices 130, 140, 150, 160, and/or bridges 170. For example, the PCIe communication system 100 may include a switch 120 as a transaction layer packet (TLP) relay device between the root complex 106 and PCIe endpoint device(s) 130, 140, 150. As will be appreciated, a switch may implement a logical assembly of multiple virtual PCIe bridge devices (i.e., logical PCIe-to-PCIe bridges), such as a network switch that controls multiple point-to-point serial connections by using packet switching to receive, process, and forward data to each endpoint device (e.g., PCIe endpoint devices 130, 140, 150). For example, switch 120 may be configured to provide a fan-out from root complex 106 to links 115A/B, 116A/B, 117A/B, and to provide link scaling so that the available PCIe bus bandwidth is allocated, such that a predetermined number of links 115A/B, 116A/B, 117A/B, each having a size conforming to PCIe architecture standards, are physically routed to PCIe endpoint devices 130, 140, 150. Under the PCIe specification, each link (e.g., 115A/B) includes one or more lanes, with a link having a single lane (also referred to as having a x1 width) being implemented with two low-voltage differential pairs to provide a dual simplex serial connection between two PCIe devices. In addition, the depicted PCIe communication system 100 may include a PCIe endpoint device 160 that is directly connected to the root complex 106 via PCIe bus 113A/B (e.g., without having to use switch 120). For example, if the PCIe communication system 100 is embodied as a desktop computer, the PCIe endpoint device 160 may be a graphics adapter, a hard disk drive (HDD) (via a serial ATA link), or the like. Alternatively, if the PCIe communication system 100 is embodied as a server, the PCIe endpoint device 160 may be a gigabit Ethernet (GbE) and/or an additional bridge device.

To support advance status reporting for discovering an endpoint device failure on a PCI Express interconnect bus, the root complex 106 may include a centralized endpoint device failure advance reporting module 110 which is communicatively coupled to one or more PCIe endpoint devices 130, 140, 150, 160, 170 which each include an advance status reporting module 132, 142, 152, 162, 172. In addition, each PCIe endpoint device 120, 130, 140, 150, 160, 170 includes a PCI extended configuration space (PCS) 121, 131, 141, 151, 161, 171 which includes a dedicated memory word (4 bytes) in the extended PCIe configuration space for each endpoint device. In each PCIe endpoint device (e.g., 130), a dedicated memory word (e.g., 4 bytes) is defined in the PCIe configuration space (e.g., 131) by the host CPU 101 for periodically soliciting endpoint device status reporting that can be monitored by the host software to detect any failure by the endpoint device to provide a status report, thereby indicating a failure in the endpoint device(s).

Though illustrated as being located in the root complex 106, the centralized endpoint device failure advance reporting module 110 may be executed in whole or in part by the host CPU 101 as host software in the form of the EP device failure advance reporting module 30. Alone or in combination with an advance status reporting module 132, 142, 152, 162, 172 at each PCIe endpoint device, the host software sets up the extended PCI configuration space (e.g., 131) of each PCIe endpoint device or switch or bridge (e.g., 130) to include a capabilities pointer which points to the next capabilities pointer in the PCIe capabilities register set which, in turn, points to the dedicated memory word. In an example embodiment, the dedicated memory word in the PCIe configuration space of each PCIe endpoint device includes a first advance reporting capability indication byte (Byte 0) for the EP device, a second next capabilities pointer byte (Byte 1), a third root complex request byte (Byte 2), and a fourth endpoint response byte (Byte 3) which contains any response received from the EP device. Of course, the order and sequence of bytes in the dedicated memory word can be changed. In operation, host software is configured during enumeration to check each EP device's advance reporting capability indication byte (e.g., Byte 0) to determine if the EP device supports advance reporting and to start a thread for advance status reporting from each EP device which supports advance reporting. In addition, the host software may be configured to periodically clear the endpoint response byte (e.g., Byte 3) to a 0 value and to program the root complex request byte (e.g., Byte 2) to request advance status reporting in the EP device configuration space, thereby triggering the EP device to collect the required status and update the fourth byte (Byte 3) with the EP response. By periodically checking to see if the endpoint response byte (e.g., Byte 3) contains a 0 value, the host software can report the EP device failure to upper software to initiate device recovery.

As will be appreciated, the PCIe communication system 100 may be implemented with a data processing system, such as a personal computer system, server, workstation, network storage device, embedded system, or any other suitable computer system. Generally speaking, a "data processing system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. As such, the data processing system may include random access memory (RAM), one or more processing resources (such as a CPU, hardware or software control logic), read only memory (ROM), and/or other types of memory. Additional components of the data processing system may include one or more disk drives, one or more network ports for communicating with external devices, as well as various input and output (I/O) devices, such as a keyboard, a mouse, and a video display. The data processing system may also include one or more buses operable to transmit communications between the various hardware components.

Figure 2:
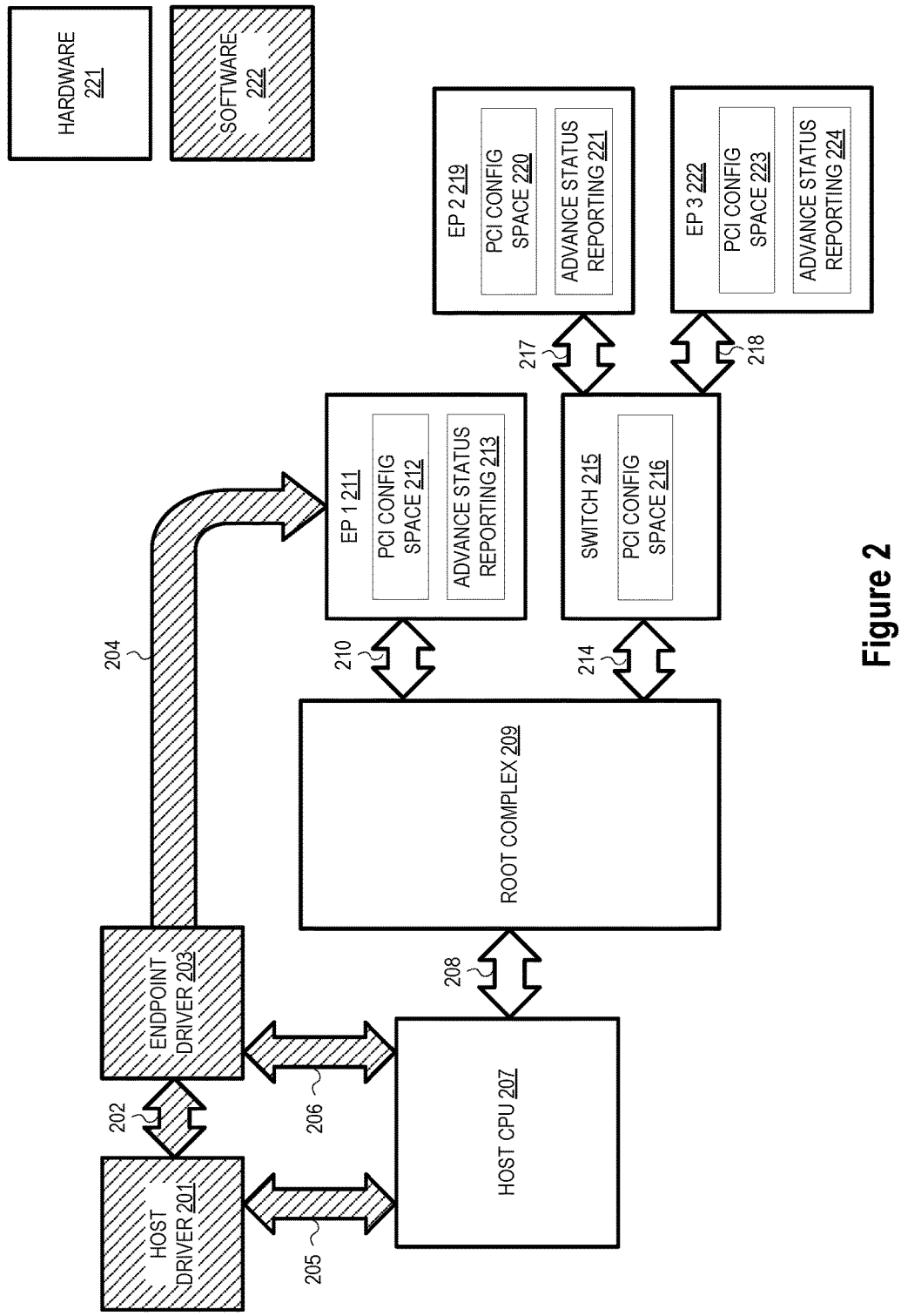
FIG. 2 is a simplified block diagram illustration of the hardware and software components of the endpoint device failure advance reporting system in accordance with selected embodiments of the present disclosure.

To provide additional details for an improved understanding of selected embodiments of the present disclosure, reference is now made to FIG. 2 which depicts a simplified block diagram 200 of the hardware and software components of an endpoint device failure advance reporting system which is embodied as a PCIe communication system. As indicated with the hardware legend 221, the hardware system components include a host CPU 207 which is connected over a front side bus 208 to the root complex hardware 209. In addition, the root complex hardware 209 is connected over a first PCIe bus 210 to a first endpoint device 211, and is also connected over a second PCIe bus 214 to a switch 215. In turn, the hardware switch 215 is connected over a third PCIe bus 217 to a second endpoint device 219, and is also connected over a fourth PCIe bus 218 to a third endpoint device 222.

As indicated with the software legend 222, the software system components include a host driver 201 and endpoint driver 203 which are stored in memory and executed by the host CPU 207 to exchange information 202 with one another. In addition, the host CPU 207 and software drivers 201, 203 are communicatively coupled to exchange data and/or instructions 205, 206 and to control the endpoint devices (e.g., 211) with configuration data 204. In this arrangement, the host CPU 207 and software drivers 201, 203 are communicatively coupled through the root complex 209 to access the PCI configuration space 212 in the first PCIe endpoint device 211 using the PCIe switch-based serial interconnect busses 208, 210. In similar fashion, the host CPU 207 and software drivers 201, 203 are communicatively coupled through the root complex 209 to access the PCI configuration space 216 in the switch 215, as well as the PCI configuration spaces 220, 223, respectively, in the PCIe endpoint devices 219, 222 using the PCIe switch-based serial interconnect busses 208, 214, 217, 218. In addition, the CPU 207 may be operatively coupled through the root complex 209 and/or device drivers 201, 203 to access the advance status reporting modules 213, 221, 224 in the PCIe endpoint devices 211, 219, 222 to perform advance reporting of the endpoint device status to the root complex 209 and/or host CPU 207.

As disclosed herein, each of the advance status reporting modules 213, 221, 224 may be configured to specify, at each endpoint device, a reporting word having a set of specified values or bytes which enable the host CPU 207 to detect when an endpoint device has failed and then undertake necessary action to restart the endpoint device. To this end, each reporting word stored in the PCIe configuration space (e.g., 212) of an endpoint device (e.g., 211) may include a capability byte or value which signals whether the endpoint device has an advance reporting capability. In addition, the reporting word may include an endpoint response status byte or value which is periodically cleared by the host CPU 207 in preparation of receiving a status report from the endpoint device that is functional. In addition, the reporting word may include an endpoint status request byte or value which is periodically set by the host CPU 217 to trigger or prompt the endpoint device to provide a status report. By clearing the endpoint response status byte/value and setting the endpoint status request byte/value, the host CPU 207 can subsequently check the endpoint response status byte/value to see if the endpoint device wrote a response to the endpoint response status byte/value. If so, then the endpoint device is functional. If not, then the endpoint device is not functional, in which case the host CPU 207 software may invoke a recovery loop and/or perform a device restart or link restart and issue rescan of the bus (e.g. 210).

Figure 3:
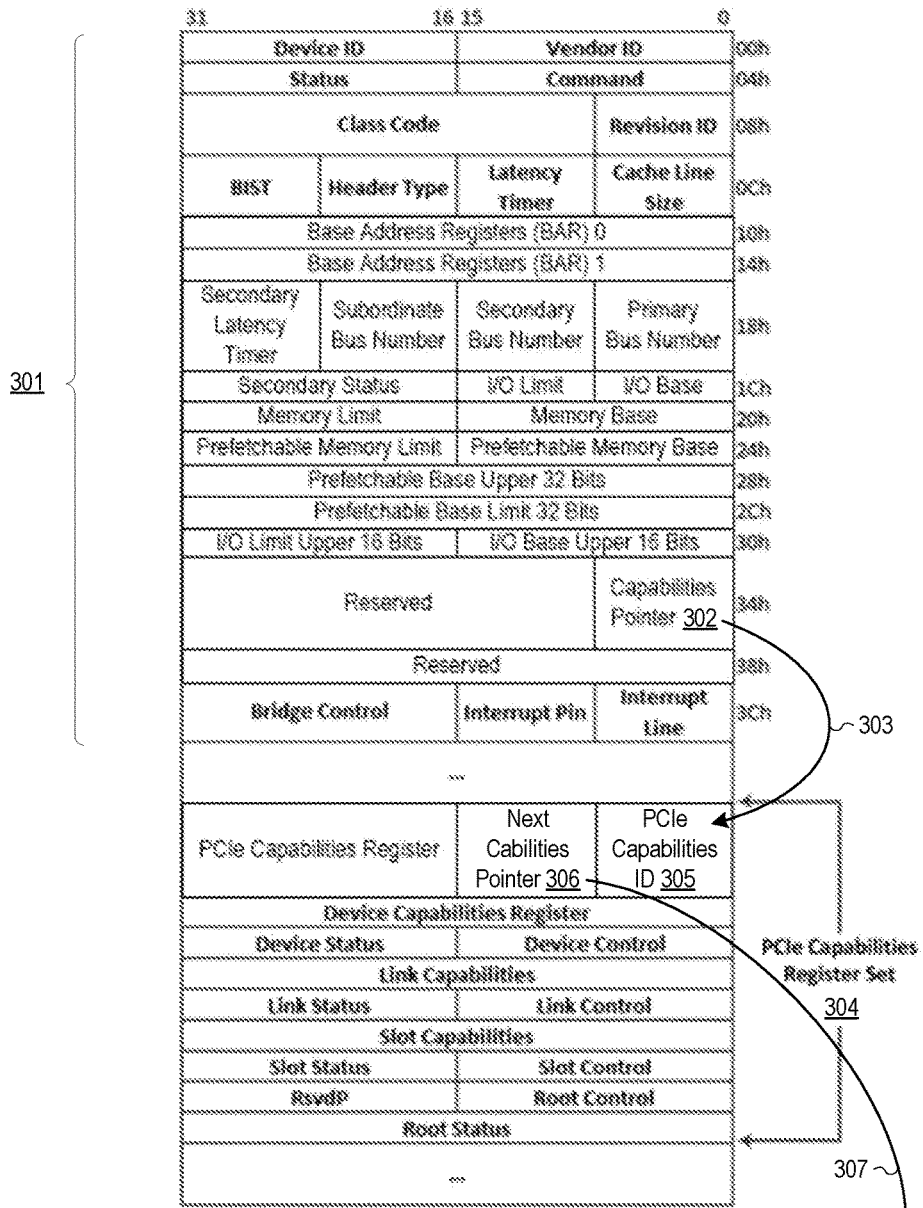
FIG. 3 shows PCIe device configuration space registers used to implement endpoint device failure advance reporting in accordance with selected embodiments of the present disclosure.
Figure 3:
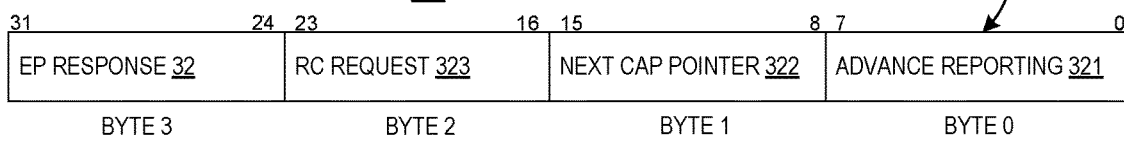

To provide additional details for an improved understanding of selected embodiments of the present disclosure, reference is now made to FIG. 3 which shows PCIe device configuration space registers 300 which may be used to implement endpoint device failure advance reporting. As illustrated, the PCIe device configuration space registers 300 includes a PCIe configuration space header 301 having a shared set of common register fields. These registers are defined for both Type 0 and Type 1 configuration space headers. As illustrated, the PCIe configuration space header 301 includes, inter alia, a Device ID register, a Vendor ID register, a Status register, a Command register, as well as one or more Base Address Registers and an 8-bit capabilities pointer register 302, and so on. The Device ID register identifies a unique ID to describe the PCIe device itself. The Vendor ID register identifies a unique ID to describe the originator of the PCIe device. Further, the Device ID (DID) and Vendor ID (VID) registers are both used to identify the PCIe device, and are commonly called the PCIe ID (or PCI ID). For example, the 16-bit vendor ID is allocated by the PCI-SIG, and the 16-bit device ID is then assigned by the vendor.

The depicted PCIe configuration space header 301 includes a set of bit position numbers at the top of the header table (e.g., 0, 15, 16, and 31) that mark the bit position in the registers of PCIe configuration space header 301. In addition, the depicted PCIe configuration space header 301 includes a set of numbers on the right of header table (e.g., 00h-3Ch) that mark the byte offset of the registers in PCI configuration space header 301. For example, to address a PCIe device, it must be enabled by being mapped into the system's IO port address space or memory-mapped address space. For example, the system's OS 10, device drivers 20, or firmware may be configured to program the Base Address Registers (e.g., BAR0, BAR1) to identify the address mapping of a PCIe device. As such, processing logic of PCIe communication system 100 may discover one or more PCIe devices under test (DUT) and the root complexes of the respective PCIe devices to identify a physical PCIe slot in which a PCIe device is inserted/reinserted, such that the one or more PCIe devices may be concurrently identified and tested. Note that each PCIe device includes capabilities pointer register 302 which provides a mechanism to extend the configuration space of a PCIe device (as compared to a PCI device) by specifying a pointer 303 to a PCIe configuration space extension 304 (a.k.a., PCI capabilities register set). As depicted, the PCIe configuration space extension 304 may include a PCIe Capabilities Register, a Next Capabilities Pointer 306, a PCIe Capabilities ID 305, a Device Capabilities Register, a Device Status field, a Device Control field, a Link Capabilities register, a Link Status field, a Link Control field, a Slot Capabilities register, a Slot Status field, a Slot Control field, a RsvdP field, a Root Control field, a Root Status field, etc. For example, when the PCI capabilities register set 304 is enabled, it is tied together by a linked list 303 that starts with an 8-bit capabilities pointer 302 at address 34h in PCIe device configuration space header 301. Note that each capability structure set also has a unique capability ID. In particular, the capabilities pointer register 302 points to the PCIe Capabilities ID 305 at the start of PCIe capabilities register set 304 by using an 8-bit offset (in bytes) 303 at the start of PCIe capabilities register set 303. This 8-bit offset is stored in capabilities pointer register 302. While the position of PCIe capabilities register set 304 is device-specific, it is placed in the first 256 bytes of the PCIe device configuration space 300 and located after the mandatory PCI header. As a result, the processing logic of PCIe communication system 100 may be used to access multiple PCIe configuration space headers (e.g., PCIe capabilities register set 304 and PCIe configuration space header 300) in order to read the statuses of the PCIe and root complex devices, modify the states of the PCIe and root complex devices, and/or clear any errors of the PCIe and root complex devices.

In the position of PCIe capabilities register set 304, a next capabilities pointer register 306 points to the start of a dedicated memory control word 311 stored in the PCIe configuration space 310 by using a multi-bit offset (in bytes). As disclosed, the dedicated memory word 311 may include a first advance reporting capability indication byte 321 (e.g., Byte 0) to indicate if the endpoint device supports advance reporting, a second next capabilities pointer byte 322 (e.g., Byte 1) to provide a pointer to the next capability, a third root complex request byte 323 (e.g., Byte 2) to trigger a status report from the endpoint device, and a fourth endpoint response byte 324 (e.g., Byte 3) which contains any response received from the endpoint device. As a result, the processing logic of PCIe communication system 100 may use the Next Capabilities Pointer 306 to access the first advance reporting capability indication byte (e.g., Byte 0) of the dedicated memory control word 311 to determine if the endpoint device supports advance reporting. If so, the processing logic starts a thread for advance status reporting from the endpoint device, and then may periodically clear the fourth endpoint response byte (e.g., Byte 3) to a 0 value and program the third root complex request byte (e.g., Byte 2) to request advance status reporting in the endpoint device configuration space, thereby triggering the EP device to collect the required status and update the fourth endpoint response byte with the endpoint response. By periodically checking to see if the endpoint response byte (e.g., Byte 3) contains a 0 value, the processing logic of PCIe communication system 100 can report the endpoint device failure to upper software to initiate device recovery.

Figure 4:
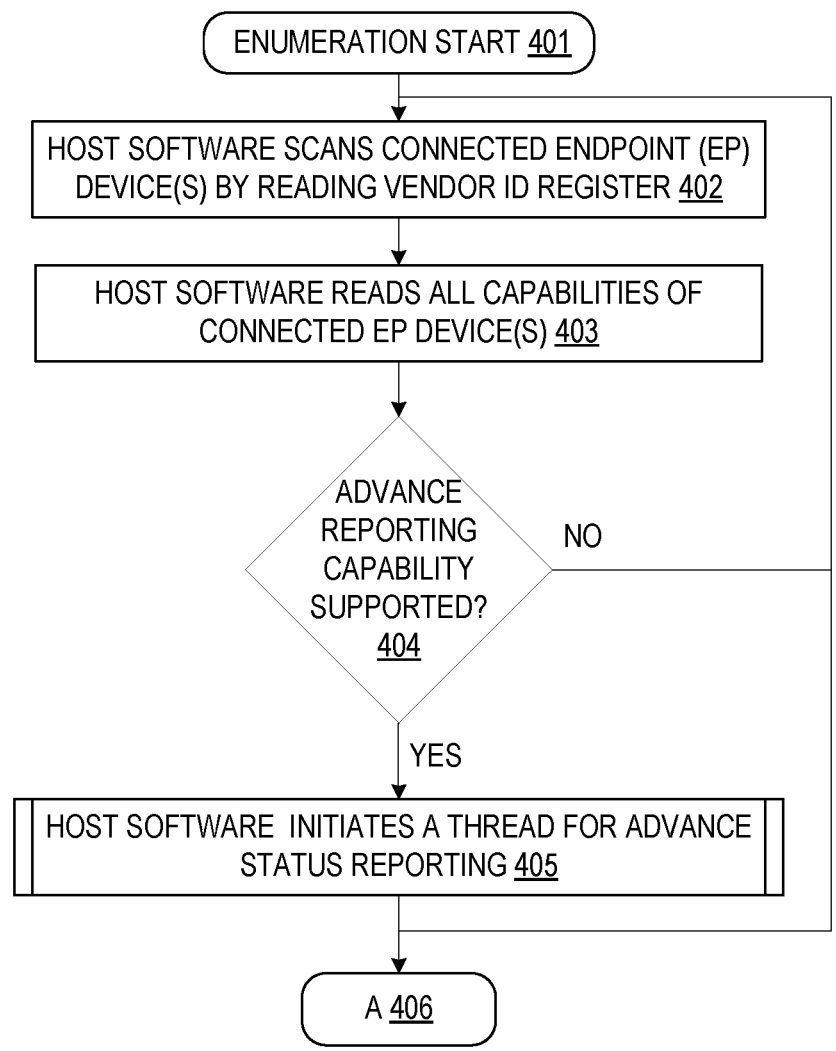
FIG. 4 depicts a simplified flow chart showing the logic for a host software to initiate an advance status reporting procedure in accordance with selected embodiments of the present disclosure.

To provide additional details for an improved understanding of selected embodiments of the present disclosure, reference is now made to FIG. 4 which depicts a simplified flow chart 400 showing the logic for a host software to initiate an advance status reporting procedure. In an example embodiment, the control logic and methodology shown in FIG. 4 may be implemented as hardware and/or software on a host computing system, processor, or microcontroller unit that includes processor and memory for storing programming control code for controlling the operation of one or more PCIe endpoint devices connected to a root complex device.

The process starts (step 401) when the PCIe system begins the enumeration process of detecting which devices are connected to the host. As will be appreciated, the enumeration process may be implemented by the root complex or host sending configuration packets to assign unique bus, device and function numbers to the detected endpoint (EP) devices. Once the enumeration process identifies any connected endpoint devices, the host software scans them by reading vendor ID register (step 402) and then reading all the capabilities of each connected endpoint device (step 403). In reading the EP device capabilities, the host will scan each PCIe EP device's extended configuration space to check which EP devices support advance status reporting (step 404). In particular, the host may be directed by pointers in the PCIe device configuration space registers to the dedicated advance status reporting (ASR) memory control word in the extended configuration space to detect if a first advance reporting capability indication byte (e.g., Byte 0) has a predetermined value (e.g., 0x5A) which indicates that advance status reporting is supported by the EP device. If the first advance reporting capability indication byte does not store the predetermined value, this indicates that advance status reporting is not supported (negative outcome to detection step 404), and the process then restarts another round of scanning the connected EP devices (step 402). However, if the first advance reporting capability indication byte does store the predetermined value, this indicates that advance status reporting is supported (affirmative outcome to detection step 404), and the host then initiates a thread for advance status report monitoring of the EP device (step 405). With the thread, the host is able to periodically monitor the EP device status in runtime as indicated by the connection Step A (406).

Figure 5:
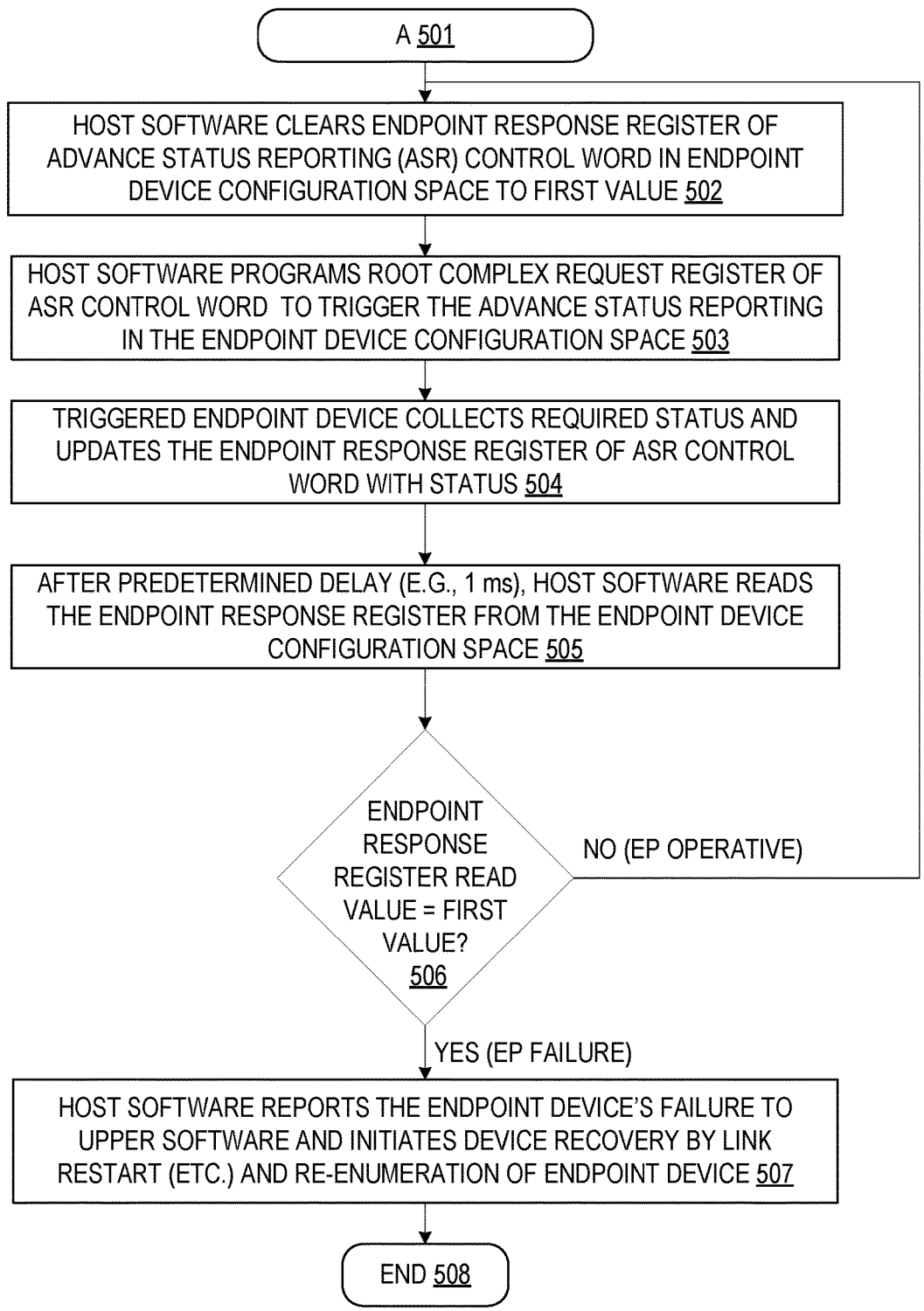
FIG. 5 depicts a simplified flow chart showing the logic for a host software to periodically program and read advance status reporting registers in the PCIe configuration space of each PCIe endpoint device in accordance with selected embodiments of the present disclosure.

To provide additional details for an improved understanding of selected embodiments of the present disclosure, reference is now made to FIG. 5 which depicts a simplified flow chart 500 showing the logic for monitoring the EP device status with a host software which periodically programs and reads advance status reporting registers in the PCIe configuration space of each PCIe endpoint device. In an example embodiment, the control logic and methodology shown in FIG. 5 may be implemented as hardware and/or software on the host computing system, processor, or microcontroller unit that includes processor and memory for storing programming control code for controlling the operation of one or more PCIe endpoint devices connected to a root complex device.

Continuing from the process 400 at connection Step A (501), the monitoring process begins at step 502 when, for each EP device which supports advance status reporting, the host programs a first value into the endpoint response register (e.g., Byte 3) of the dedicated ASR memory control word for each EP device. In selected embodiments, the host software programs a first value by clearing the endpoint response register of the dedicated ASR memory control word to a 0 value. At step 503, the host software then programs, for each EP device which supports advance status reporting, the second root complex request register (e.g., Byte 2) of the dedicated ASR memory control word to a predetermined value which will trigger a status report from the endpoint device. In response to the programmed value, the corresponding EP device collects the required status information and updates the fourth endpoint response register (e.g., Byte 3) of the dedicated ASR memory control word with the status information (step 504). After a predetermined delay (e.g., 1 ms), the host software reads the endpoint response register from the EP device configuration space (step 505) in order to see if the first value (e.g., 0) is still stored in the endpoint response register. If not (negative outcome to detection step 506), this indicates that the EP device is operative since the triggered EP device updated the endpoint response register to a different read value from the first value, and the process returns to step 502 to periodically restart the monitoring process. However, the endpoint response register still stores the first value (e.g., 0) (affirmative outcome to detection step 506), this indicates that the EP device failed or is otherwise not operative since the triggered EP device was not able to update the endpoint response register, and the process proceeds to step 507 to where the host software reports the failure of the EP device to upper software control to initiate EP device recovery, such as with a link restart process and subsequent re-enumeration of the EP device. At step 508, the process ends or alternatively returns to the enumeration process and continued periodic monitoring of EP devices.

By now it should be appreciated that there has been provided a computer-implemented method, architecture, circuit, and system for detecting failure of a peripheral component interconnect express (PCIe) endpoint device. In the disclosed methodology, a host software detects that one or more PCIe endpoint devices are connected to a data processing system. In addition, the host software scans an extended configuration space for each connected PCIe endpoint device to detect a first PCIe endpoint device that supports advance status reporting. The host software also programs a first predetermined value into an endpoint response register of a dedicated memory control word in the extended configuration space for the first PCIe endpoint device. Subsequently, the host software programs a second predetermined value into a root complex request register of the dedicated memory control word in the extended configuration space for the first PCIe endpoint device, where the second predetermined value signals a request to the first PCIe endpoint device to update the endpoint response register of the dedicated memory control word with a new status value. After a minimum specified delay, the host software reads the endpoint response register of the dedicated memory control word and reports that the first PCIe endpoint device has failed in response to detecting that the first predetermined value is stored in the endpoint response register. In selected embodiments, the dedicated memory control word is embodied as a memory word in the extended configuration space for the first PCIe endpoint device. In addition, the memory word may, in selected embodiments, include a first advance reporting capability indication register for the first PCIe endpoint device, a second root complex request register for triggering a response by the first PCIe endpoint device, and a third endpoint response register which contains any triggered response received from the first PCIe endpoint device. In such embodiments, the host software scans the extended configuration space by scanning the first advance reporting capability indication register to detect that the first PCIe endpoint device supports advance status reporting. In addition, the host software may program the first predetermined value by resetting the third endpoint response register to a 0 value. In addition, the host software may program the second predetermined value to signal a request to the first PCIe endpoint device to set the endpoint response register of the dedicated memory control word with a 1 value. In selected embodiments, the disclosed methodology may also include periodically repeating the steps of programming the first predetermined value into the endpoint response register, programming the second predetermined value into the root complex request register, and reading the endpoint response register of the dedicated memory control word.

In another form, there is provided a device for detecting failure of a peripheral component interconnect express (PCIe) endpoint device. The disclosed device includes at least one processing device configured to execute a host operating system (OS), a first memory coupled to the processing device to store a Unified Extensible Firmware Interface (UEFI) table, and a communication bus operatively coupled to the processing device and configured for data communication with an endpoint device. The disclosed processing device is to perform a specified sequence of steps. In particular, the processing device is configured to detect that one or more PCIe endpoint devices are connected to communication bus. In addition, the processing device is configured to scan an extended configuration space for each connected PCIe endpoint device to detect a first PCIe endpoint device that supports advance status reporting. In selected embodiments, each connected PCIe endpoint device may include device firmware and memory registers that contain an extended configuration space for the connected PCIe endpoint device. In other selected embodi-ments, the communication bus is a Peripheral Component Interconnect Express (PCIe) serial expansion bus and the extended configuration space for each connected PCIe endpoint device is a PCIe extended configuration space. In addition, the processing device is configured to program a first predetermined value into an endpoint response register of a dedicated memory control word in the extended configuration space for the first PCIe endpoint device. In addition, the processing device is configured to program a second predetermined value into a root complex request register of the dedicated memory control word in the extended configuration space for the first PCIe endpoint device, where the second predetermined value signals a request to the first PCIe endpoint device to update the endpoint response register of the dedicated memory control word with a new status value. In selected embodiments, the dedicated memory control word includes a first advance reporting capability indication register for the first PCIe endpoint device, a second root complex request register for triggering a response by the first PCIe endpoint device, and a third endpoint response register which contains any triggered response received from the first PCIe endpoint device. In such embodiments, the processing device may be configured to scan the extended configuration space for each connected PCIe endpoint device by scanning the first advance reporting capability indication register to detect that the first PCIe endpoint device supports advance status reporting. In addition or in the alternative, the processing device may be configured to program the first predetermined value by resetting the third endpoint response register to a 0 value. In addition or in the alternative, the processing device may be configured to program the second predetermined value to signal a request to the first PCIe endpoint device to set the endpoint response register of the dedicated memory control word with a 1 value. In addition, the processing device is configured to wait for a minimum specified delay before reading the endpoint response register of the dedicated memory control word. Finally, the processing device is configured to report that the first PCIe endpoint device has failed in response to detecting that the first predetermined value is stored in the endpoint response register. In selected embodiments, the processing device may also be configured to periodically repeating the steps of programming the first predetermined value into the endpoint response register, programming the second predetermined value into the root complex request register, and reading the endpoint response register of the dedicated memory control word.

In yet another form, a processing system is provided which includes logic instructions on a non-transitory storage medium. In selected embodiments, the logic instructions may be implemented as a computer program product which is embodied as a non-transitory machine-readable medium having instructions stored therein for execution by a processor to periodically test for failure of a peripheral component interconnect express (PCIe) endpoint device. As disclosed, the logic instructions may embody host software that is executed by the processor detect that one or more PCIe endpoint devices connected to a communication bus support advance status reporting. In addition, the logic instructions or host software may be configured to reset an endpoint response register of an extended configuration space for each of the one or more PCIe endpoint devices to a first predetermined value. In addition, the logic instructions or host software may cause the processor to program a predetermined response trigger value in a root complex request register of the extended configuration space for each of the one or more PCIe endpoint devices, where the predetermined response trigger value signals a request to a corresponding PCIe endpoint device to update the endpoint response register with a new status value. In selected embodiments, each of the one or more PCIe endpoint devices may include an extended configuration space wherein a dedicated memory control word is stored which comprises the endpoint response register and the root complex request register. In such embodiments, the dedicated memory control word for each of the one or more PCIe endpoint devices may also include an advance reporting capability indication register for storing a predetermined advance status reporting value which indicates that the corresponding PCIe endpoint device supports advance status reporting. In addition, the logic instructions or host software may cause the processor to wait until after a minimum specified delay before reading the endpoint response register of each of the one or more PCIe endpoint devices to detect if said PCIe endpoint device has failed to respond to the predetermined response trigger value. In selected embodiments, the logic instructions may be configured to report that a first PCIe endpoint device has failed in response to detecting that the first predetermined value is stored in the endpoint response register for the first PCIe endpoint device. In other selected embodiments, the logic instructions may be configured to report that a first PCIe endpoint device has not failed in response to detecting that the first predetermined value is not stored in the endpoint response register for the first PCIe endpoint device.

Although the described exemplary embodiments disclosed herein focus on example PCIe interconnect devices, systems, and methods for using same, the present invention is not necessarily limited to the example embodiments illustrate herein. For example, various embodiments of providing advance status reporting for PCIe endpoint device failure detection may be applied in any suitable data processing system application, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article or apparatus that comprises a list of elements does not include only those elements but may include other elements not expressly listed or inherent to such process, method, article, or apparatus.

What is claimed is:

1. A computer-implemented method for detecting failure of a peripheral component interconnect express (PCIe) endpoint device, comprising:
    detecting, by host software, that one or more PCIe endpoint devices are connected to a data processing system;
    scanning, by host software, an extended configuration space for each connected PCIe endpoint device to detect a first PCIe endpoint device that supports advance status reporting;
    programming, by host software, a first predetermined value into an endpoint response register of a dedicated memory control word in the extended configuration space for the first PCIe endpoint device;
    programming, by host software, a second predetermined value into a root complex request register of the dedicated memory control word in the extended configuration space for the first PCIe endpoint device, where the second predetermined value signals a request to the first PCIe endpoint device to update the endpoint response register of the dedicated memory control word with a new status value;
    after a minimum specified delay, reading, by host software, the endpoint response register of the dedicated memory control word; and
    reporting, by the host software, that the first PCIe endpoint device has failed in response to detecting that the first predetermined value is stored in the endpoint response register.

2. The computer-implemented method of claim 1, where the dedicated memory control word comprises a memory word in the extended configuration space for the first PCIe endpoint device.

3. The computer-implemented method of claim 2, where the memory word comprises a first advance reporting capability indication register for the first PCIe endpoint device, a second root complex request register for triggering a response by the first PCIe endpoint device, and a third endpoint response register which contains any triggered response received from the first PCIe endpoint device.

4. The computer-implemented method of claim 3, where scanning the extended configuration space for each connected PCIe endpoint device comprises scanning the first advance reporting capability indication register to detect that the first PCIe endpoint device supports advance status reporting.

5. The computer-implemented method of claim 3, where programming the first predetermined value comprises resetting the third endpoint response register to a 0 value.

6. The computer-implemented method of claim 3, where the second predetermined value signals a request to the first PCIe endpoint device to set the endpoint response register of the dedicated memory control word with a 1 value.

7. The computer-implemented method of claim 1, further comprising periodically repeating the steps of programming the first predetermined value into the endpoint response register, programming the second predetermined value into the root complex request register, and reading the endpoint response register of the dedicated memory control word.

8. A device for detecting failure of a peripheral component interconnect express (PCIe) endpoint device comprising:
    at least one processing device configured to execute a host operating system (OS);
    a first memory coupled to the processing device; and
    a communication bus operatively coupled to the processing device and configured for data communication with an endpoint device;

where the processing device is configured to perform the following steps:
- detecting that one or more PCIe endpoint devices are connected to communication bus;
- scanning an extended configuration space for each connected PCIe endpoint device to detect a first PCIe endpoint device that supports advance status reporting;
- programming a first predetermined value into an endpoint response register of a dedicated memory control word in the extended configuration space for the first PCIe endpoint device;
- programming a second predetermined value into a root complex request register of the dedicated memory control word in the extended configuration space for the first PCIe endpoint device, where the second predetermined value signals a request to the first PCIe endpoint device to update the endpoint response register of the dedicated memory control word with a new status value;
- after a minimum specified delay, reading the endpoint response register of the dedicated memory control word; and
- reporting that the first PCIe endpoint device has failed in response to detecting that the first predetermined value is stored in the endpoint response register.

9. The device of claim 8, where each connected PCIe endpoint device comprises device firmware and memory registers that contain an extended configuration space for the connected PCIe endpoint device.

10. The device of claim 8, where the communication bus is a Peripheral Component Interconnect Express (PCIe) serial expansion bus and where the extended configuration space for each connected PCIe endpoint device is a PCIe extended configuration space.

11. The device of claim 8, where the dedicated memory control word comprises a first advance reporting capability indication register for the first PCIe endpoint device, a second root complex request register for triggering a response by the first PCIe endpoint device, and a third endpoint response register which contains any triggered response received from the first PCIe endpoint device.

12. The device of claim 11, where the processing device is configured to scan the extended configuration space for each connected PCIe endpoint device by scanning the first advance reporting capability indication register to detect that the first PCIe endpoint device supports advance status reporting.

13. The device of claim 11, where the processing device is configured to program the first predetermined value by resetting the third endpoint response register to a 0 value.

14. The device of claim 11, where the processing device is configured to program the second predetermined value to signal a request to the first PCIe endpoint device to set the endpoint response register of the dedicated memory control word with a 1 value.

15. The device of claim 11, where the processing device is further configured to periodically repeating the steps of programming the first predetermined value into the endpoint response register, programming the second predetermined value into the root complex request register, and reading the endpoint response register of the dedicated memory control word.

16. A processing system, comprising:
logic instructions on a non-transitory storage medium configured to:
- detect that one or more PCIe endpoint devices connected to a communication bus support advance status reporting;
- reset an endpoint response register of an extended configuration space for each of the one or more PCIe endpoint devices to a first predetermined value;
- program a predetermined response trigger value in a root complex request register of the extended configuration space for each of the one or more PCIe endpoint devices, where the predetermined response trigger value signals a request to a corresponding PCIe endpoint device to update the endpoint response register with a new status value; and
- after a minimum specified delay, read the endpoint response register of each of the one or more PCIe endpoint devices to detect if said PCIe endpoint device has failed to respond to the predetermined response trigger value.

17. The processing system of claim 16, where the logic instructions are configured to report that a first PCIe endpoint device has failed in response to detecting that the first predetermined value is stored in the endpoint response register for the first PCIe endpoint device.

18. The processing system of claim 16, where each of the one or more PCIe endpoint devices comprises an extended configuration space wherein a dedicated memory control word is stored which comprises the endpoint response register and the root complex request register.

19. The processing system of claim 18, where the dedicated memory control word for each of the one or more PCIe endpoint devices further comprises an advance reporting capability indication register for storing a predetermined advance status reporting value which indicates that the corresponding PCIe endpoint device supports advance status reporting.

20. The processing system of claim 16, where the logic instructions are configured to report that a first PCIe endpoint device has not failed in response to detecting that the first predetermined value is not stored in the endpoint response register for the first PCIe endpoint device.

* * * * *